United States Patent
van Overbeek et al.

(10) Patent No.: US 11,883,855 B2
(45) Date of Patent: Jan. 30, 2024

(54) DEVICE AND METHOD FOR SORTING PLIES

(71) Applicant: Airborne International B.V., 's-Gravenhage (NL)

(72) Inventors: Thomas Theodorus Arnoldus van Overbeek, 's-Gravenhage (NL); Casper Marinus Hofstede, 's-Gravenhage (NL); Johannes Paul van Sighem, 's-Gravenhage (NL); Tjalling Stelma, 's-Gravenhage (NL)

(73) Assignee: Airborne International B.V., s-Gravenhage (NL)

( * ) Notice: Subject to any disclaimer, the term of this patent is extended or adjusted under 35 U.S.C. 154(b) by 134 days.

(21) Appl. No.: 16/623,734

(22) PCT Filed: Jun. 19, 2018

(86) PCT No.: PCT/NL2018/050397
§ 371 (c)(1),
(2) Date: Dec. 17, 2019

(87) PCT Pub. No.: WO2018/236212
PCT Pub. Date: Dec. 27, 2018

(65) Prior Publication Data
US 2020/0215579 A1      Jul. 9, 2020

(30) Foreign Application Priority Data
Jun. 19, 2017   (NL) ...................................... 2019094

(51) Int. Cl.
*B07C 5/36*       (2006.01)
*B65G 47/90*     (2006.01)

(52) U.S. Cl.
CPC ................ *B07C 5/36* (2013.01); *B65G 47/90* (2013.01); *B07C 2501/0063* (2013.01); *B65G 2201/022* (2013.01); *B65G 2249/00* (2013.01)

(58) Field of Classification Search
CPC ..... B07C 5/36; B07C 2501/0063; B07C 7/02; B65G 2201/022; B65G 2249/00
(Continued)

(56) References Cited

U.S. PATENT DOCUMENTS 8,655,477 B2 *   2/2014   Wirsam ............... B65G 49/068
                                                                  700/157
8,788,086 B2 *   7/2014   Franz .................. B65G 49/068
                                                                  700/218
(Continued)

FOREIGN PATENT DOCUMENTS

CN          2860212 Y        1/2007
CN          1915768 A        2/2007
(Continued)

OTHER PUBLICATIONS

International Search Report from PCT/NL2018/050397 dated Sep. 21, 2018.
(Continued)

*Primary Examiner* — Michael McCullough
*Assistant Examiner* — Jessica L Burkman
(74) *Attorney, Agent, or Firm* — Quarles & Brady LLP

(57) ABSTRACT

A ply sorting device is disclosed, comprising a picker and a buffer. The picker is arranged to pick planar plies of cut fiber material and move them to the buffer. The buffer comprises a plurality of substantially planar supports each arranged to receive phes from the picker and to support the plies in planar orientation. The planar supports are movably arranged relative to each other to receive the plies. In addition, a method of sorting plies of differing geometry is (Continued)

disclosed. Planar plies of cut fiber material are picked and moved to supports of a buffer where plies are received in a planar orientation, and supports are moved relative to each other to receive the plies.

22 Claims, 8 Drawing Sheets

(58) Field of Classification Search
USPC .......................................................... 209/630
See application file for complete search history.

(56) References Cited

U.S. PATENT DOCUMENTS

| | | | |
|---|---|---|---|
| 10,720,353 B2 * | 7/2020 | Schober | ............ H01L 21/67778 |
| 11,124,363 B2 * | 9/2021 | Barbaric | .............. B65G 49/068 |
| | | | 209/552 |
| 2007/0107572 A1 | 5/2007 | Pommier | |
| 2008/0093313 A1 * | 4/2008 | Huber | .................. B65G 49/068 |
| | | | 700/218 |
| 2011/0174700 A1 * | 7/2011 | Weigl | .................... B65G 49/068 |
| | | | 209/552 |
| 2019/0337718 A1 * | 11/2019 | Hedley | .................. B65G 1/065 |
| 2021/0206580 A1 * | 7/2021 | Zhu | ........................ B65G 47/90 |

FOREIGN PATENT DOCUMENTS

| | | |
|---|---|---|
| CN | 102756921 A | 10/2012 |
| CN | 105290785 A | 2/2016 |
| CN | 206213590 U | 6/2017 |
| EP | 2589553 | 5/2013 |
| JP | 6118636 | 1/1986 |
| JP | H03232604 A | 10/1991 |
| JP | H-6270084 A | 9/1994 |
| JP | H-0881017 A | 3/1996 |
| JP | 2000-117374 A | 4/2000 |
| JP | 60-44407 B2 | 12/2016 |

OTHER PUBLICATIONS

Office Action from CN Application 201880046546.7 dated Dec. 3, 2020, English translation only.
Office Action for CN 201880046546.7 dated Sep. 28, 2021, including machine translation, 46 pages.
Japanese Office Action, Application No. 2019-571474, Japanese Patent Office, dated Apr. 14, 2019, 14 pages, with Machine Translation.

* cited by examiner

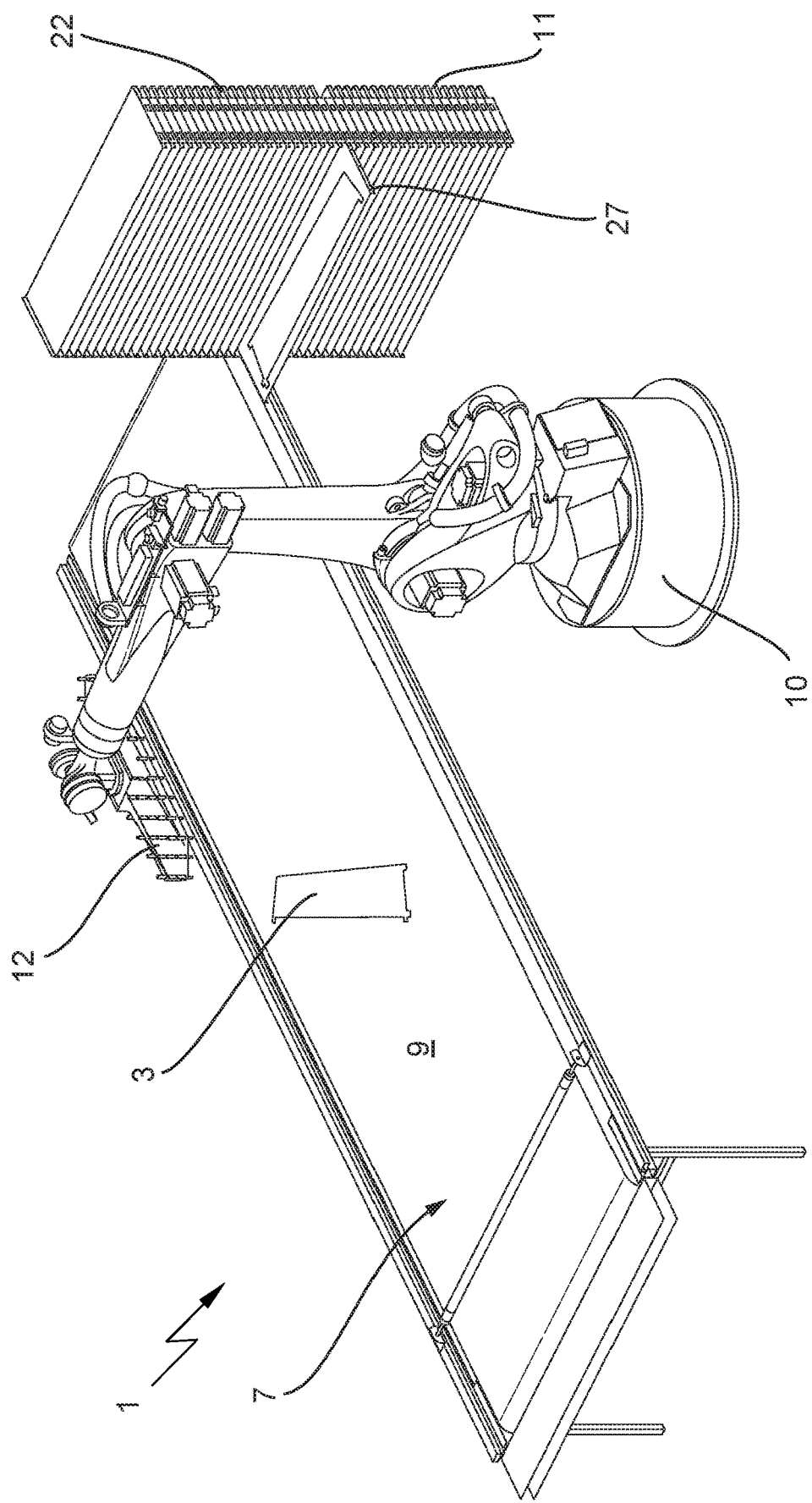

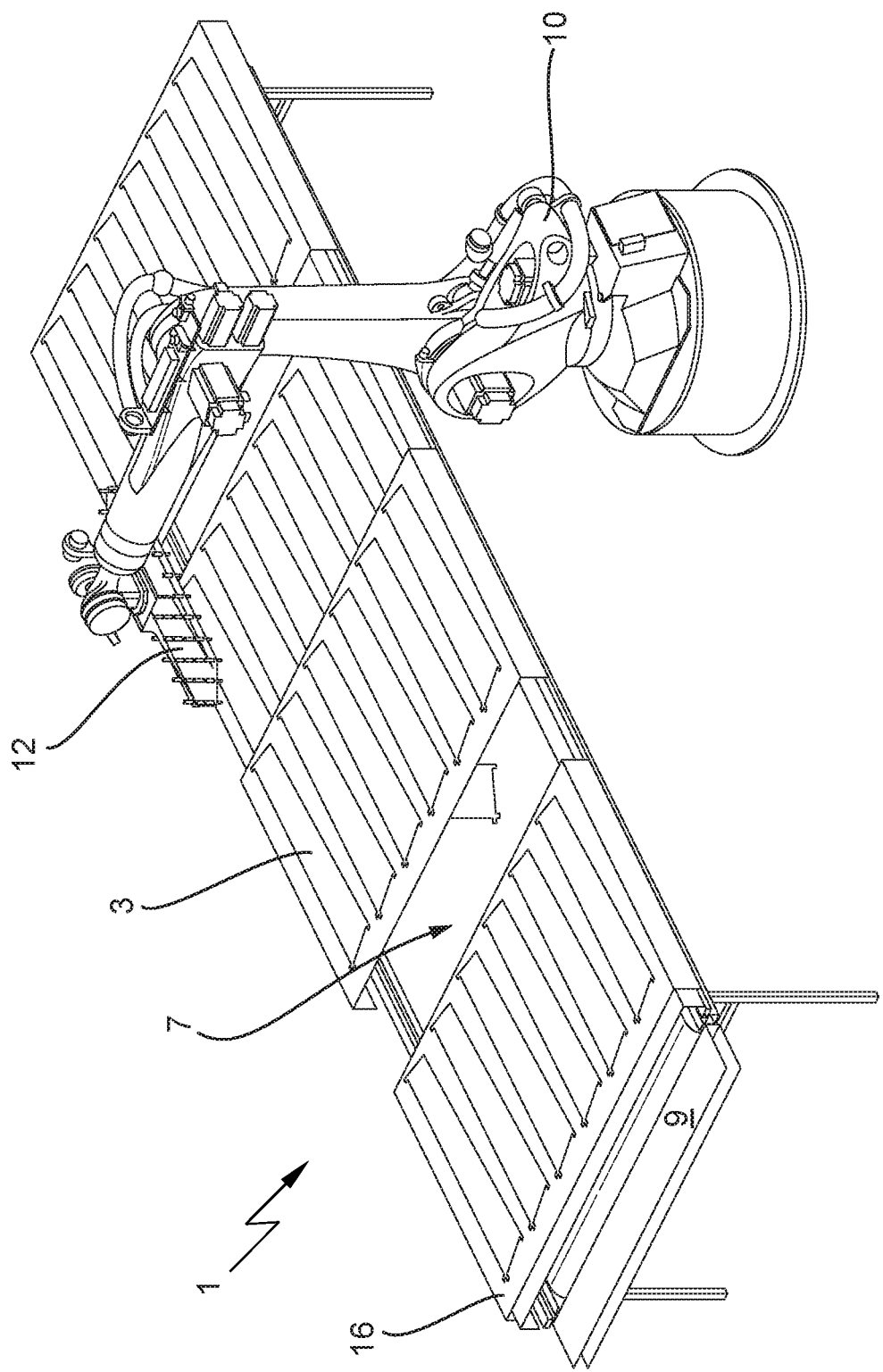

DEVICE AND METHOD FOR SORTING PLIES

RELATED APPLICATIONS

This application is a 35 U.S.C. § 371 national phase application of PCT/NL2018/050397 (WO 2018/236212), filed on Jun. 19, 2018, entitled "Device and Method for Sorting Plies", which application claims the priority to Netherlands Application No. 2019094, filed Jun. 19, 2017, which is incorporated herein by reference in its entirety.

The invention generally relates to sorting of plies, and in particular to sorting of cut plies of fiber material.

Such plies are generally known, and are used to manufacture fiber reinforced composite products. Such plies are typically cut from a sheet of fiber material. The fiber material may be dry, but may also be impregnated, e.g. with a thermosetting resin or a thermoplastic material. The plies may comprise a backing material.

The plies themselves are unfinished products: they are to be placed in layers in a mold. Typically, the plies that are to be placed in the mold have differing orientations and may have differing geometries. The plies are placed in a prescribed order in the mold. Individual plies typically have a specific location in the mold, and an orientation of its fibers to optimize the strength of the product. The layered plies in the mold are then subjected to heat and/or pressure to form a laminated product, in particular a high strength, low weight product for use in demanding applications, e.g. structural parts for use in aerospace.

Plies of different geometries may together make up a set to be used for molding of a composite product. A set of plies may typically comprise plies of different size and shape, but may comprise or even consist of plies of the same geometry. A composite product may itself be comprised of several sets of plies, the sets together forming a kit for the product. Fiber reinforced composite products as used in the aerospace industry may be composed of dozens or even hundreds of plies that need to be processed in a tightly controlled environment for quality assurance.

The fiber material is usually supplied on very long sheets that are rolled up on a roll. To optimize the use of the sheet material, the plies of several sets may be nested as cutouts in a sheet. These sets may each be identical, but may also differ. For example, different sets corresponding to smaller and larger products may be nested on the sheet to optimize use of the sheet material.

Due to the nesting, the plies are typically not in an order so that subsequent plies can be picked from the sheet to form a set. For example, a ply for a first set may come first, followed by another ply for a second set.

In order to accommodate for this, the plies are typically manually removed from the sheet, and placed on a large buffering table. The surface of the buffering table comprises several support areas, where plies are laid down. In these support areas, the plies corresponding to a set are collected in a stack.

However, the manual handing of the plies is labor intensive, and time consuming. Even with careful manual handling, errors in handling and in particular in sorting may not always be avoided. Tight quality control is required, which in itself increases costs and processing time. In addition, the large buffering table takes up floor space, which in combination with a required clean environment is expensive.

Due to limited shelf life of the resin as unfinished product, the plies should further be processed to products fairly quickly. Prolonged storage of plies or sets of plies is better avoided.

Also, as they are unfinished, the plies as cut from the sheet of fiber material are delicate, and should be handled with utmost care to prevent contamination, and loss of integrity.

With manual handling, loss of integrity can not always be ruled out, and on the buffering table the plies are easily contaminated—especially because they often reside on the buffering table longer than is desirable.

The invention aims to alleviate at least some of the above mentioned disadvantages. In particular, the invention aims to provide a device and method for sorting plies, with which the cost efficiency of handling of the plies can be increased, and/or with which the quality of the plies can be improved. In particular, the invention aims to reduce handling time, to reduce the floor space needed for sorting, to improve the control of integrity of the plies, and/or to prevent contamination.

Thereto, the invention provides for a ply sorting device, comprising a picker and a buffer, wherein the picker is arranged to pick planar plies of cut fiber material and move them to the buffer, and wherein the buffer comprises a plurality of substantially planar supports each arranged to receive plies from the picker and to support the plies in planar orientation, wherein the planar supports are movably arranged relative to each other to receive the plies.

By using a device with a picker to pick and move the plies to the supports, the integrity of the plies can be controlled better, and loss of integrity may be prevented. In particular, the plies can be moved in substantially planar orientation, which reduces the chance of damage. Also, the plies can be picked and moved to the support for the set in a single operation. Such single operation further saves handling time, and reduces the chance of damage. By arranging the planar supports to be movable relative to each other for receiving the plies, the supports may move toward the picker, and thus further save handling time. Also, by arranging the planar supports to be movable, the supports may be moved from a storage position in which they have a covering arrangement that prevents receiving of plies, to a receiving position that allows receiving of plies. Such covering arrangement saves space, and prevents contamination due to sheltering.

By interspacing the supports perpendicular to their plane, the covering arrangement may be facilitated. The supports may be arranged to be movable along their plane and/or movable perpendicular to their plane.

By embodying the supports as shelves, a compact construction may be obtained. A shelf may include a plurality of supports, e.g. adjacent supports in a plane. Elegantly, the shelves are embodied as, or may include trays. This way, the plies may be supported in a protected trough. The trays may be removable from the shelves. The trays and/or the shelves may be removable from the buffer. This way, a stack of plies may be loaded to or offloaded from the buffer with a tray or shelf.

By arranging the shelves above each other in a column, a particularly compact construction may be obtained. The column may then offer a shelter. The shelves may each be slidably mounted to a frame transversely to a longitudinal direction of the shelves.

Elegantly, the shelves may be arranged to slide outwards of the column, preferably at opposite sides of the column. The shelves may then slide out from a storage position in the column in which they overlap and are sheltered, to a receiving position adjacent the column in which they are accessible for the picker and are free to receive plies.

As an alternative, the shelves may be liftably mounted to a frame transversely to a longitudinal direction of the shelves. The shelves may then be liftably mounted with a variable interspace to accommodate the picker between shelves.

In particular, the shelves of the column may be arranged to be moved relative to each other in groups. This way, adjacent shelves of the column may be parted, and provided with an interspace to accommodate the picker, in particular the gripper head of the picker, between shelves. Elegantly, the shelves of the column may be moved up or down as a single group, so that the shelves to be parted are positioned at a fixed height before parting. Regardless of their position in the column, the shelves can be made available for the picker to access at a single height position relative to e.g. the floor. This way, the construction of the gripper may be simplified as it may travel back and forth in the same plane, and the speed of operation may be increased.

One side of the column facing the picker may be part of a stay out zone that during operation is not accessible to humans, and wherein an opposite side of the column facing away from the picker is part of a safe zone that during operation is accessible to humans. This way, the buffer may be implemented in a flexible production cell easily accessible to a robot, and yet be easily and safely accessible to humans as well.

The ply sorting device may further comprise a substantially planar pickup plane. The pickup plane may be a moving belt surface associated with the output of a sheet cutter. The pickup plane may be part of a sheet cutter, e.g. part of an output conveyor of the cutter. The pickup plane may also be part of a secondary conveyor, that in use connects to an output conveyor of the cutter. The pickup plane may, however, also be part of a stationary surface, e.g. a sorting table, or a support plane external or internal to the buffer. The pickup plane may also be part of a bin that holds a stack of plies, e.g. plies that have manually been removed as cutouts from the skeleton of a cut sheet. The buffer and picker may then form a stand alone unit.

The picker may comprise a plurality of gripper organs arranged in a gripper plane, e.g. on a gripper head. A detection plane may be arranged parallel to the pickup plane, to detect material extending between the pickup plane and the gripper plane.

The ply sorting device may be operatively associated with a sheet cutter arranged to cut plies from a sheet, e.g. via a common control unit or via a communication module. This way, the sorting device may be controlled using data from the cutter, e.g. operational data or cutting file data. Also, the cutter may be controlled using data from the sorting device, e.g. data on ply occupancy and/or availability at the supports.

The invention further relates to a method of sorting plies of differing geometry, wherein planar plies of cut fiber material are picked and moved to supports of a buffer where plies are received in a planar orientation, wherein supports are moved relative to each other to receive the plies. The supports may be moved along their plane and/or perpendicular to their plane. Elegantly, the supports may be moved apart in an upward or downward lifting operation to receive plies.

In the method, the plies may be picked by the picker as cutouts from a skeleton of a cut sheet, in particular a moving sheet. Such moving sheet may be provided by a conveyor belt of a cutter, or a feeder table. This has the advantage that the location and orientation of the plies in the sheet may be derived from the cutting data. The plies may, however, also be picked by the picker from a stationary location, e.g. a feed table or other support location, and may have e.g. been removed from the skeleton of a cut sheet in a previous operation, e.g. a manual operation. In such case, the picker may be provided with a vision system to assess the plies, e.g. to identify the plies and/or to assess the orientation. In such method a feed stream of plies may be sorted and placed in a buffer.

Using the method, plies may be sorted in a way that they are received by the supports in a stack, e.g. a stack of plies corresponding to a product, or a stack of plies that are the same or similar. Plies may also be received by the supports adjacent to each other, e.g. as single plies only or as adjacent stacks.

Using the method, plies may also be sorted within a buffer. In such case, the plies may be picked from a support of a buffer, and moved to another support within that same buffer, or moved within the same support. This may e.g. be done to place a stack of plies corresponding to a set in a desired order.

Using the method, plies may also be removed from the buffer to be sorted. In such case, the plies may also be picked from a support of a buffer, and moved to a support outside of the buffer, e.g. an external support. In the sorting operation, plies may then be picked up from supports in the buffer and received by the external support to be stacked in a stack in a desired order. Such support outside of the buffer may elegantly be located in a second buffer of the ply sorting device. Such buffer and second buffer may both be accessible by the same picker. However, also a second picker may be provided together with the second buffer that can access the first buffer, e.g. in a cascaded arrangement of the device.

The cutout plies may be nested in the sheet to optimize the use of sheet material. The completion of sets in the supports of the buffer may be used as a boundary condition in the nesting of the plies in the sheet. This way, during nesting, account may be taken of the available space at the supports in the buffer. This allows for optimized use of available buffer space, and also allows processing time until completion of a set to be controlled or reduced. This feature may be seen as an invention in itself, and may also be applied to ply sorting methods and devices in which the supports are not moved relative to each other.

As part of the step of picking a ply, a select group of gripper organs from a plurality of gripper organs arranged in a gripper plane on a picker may be actuated depending on the geometry of the ply to be picked. Also, as part of the step of picking a ply, the occurrence of dragging and/or trailing of material from a picker may be detected.

Further advantageous features of the invention are defined in the dependent claims. It should be noted that the technical features and steps described above may each on its own be embodied in a ply picking and sorting device, i.e. isolated from the context in which it is described here, separate from other features or in combination with only a number of features described in the context in which it is disclosed herein. Each of these features may further be combined with any other feature disclosed, in any combination.

The invention will be further elucidated on the basis of non-limitative exemplary embodiments represented in the drawings. In the drawings:

FIG. 7 shows a schematic perspective view of a second embodiment of a ply sorting device in accordance with the invention, and FIG. 8 shows a schematic perspective view of a third embodiment of a ply sorting device in accordance with the invention.

It should be noted that the figures are merely schematic representations of preferred embodiments of invention. In the figures, identical or corresponding parts are represented with the same reference numerals.

Referring to FIGS. 1-6, a ply sorting device 1 according to a first embodiment of the invention is discussed. The ply sorting device 1 works in tandem with a cutter 2.

The material for the plies 3 is supplied as a sheet 4 of fiber material. The fiber material may be carbon fiber, but may also be or comprise other type of fiber material, e.g. glass fiber or aramid fiber. The fiber material may have woven, or non-woven strands of fibers. The strands of fibers typically each have a single orientation. Preferably, the fibers in the material are parallel unidirectional, non woven fiber strands. The fiber material may be impregnated with a resin. The resin material may be thermosetting or thermoplastic material, and in the finished product forms a matrix material. The resin may typically be uncured, e.g. in case of a thermosetting material. The resin may be sticky, e.g. in case of uncured resin. The plies 3 in this example are unfinished products: they are to be placed in layers, and subjected to heat and pressure to form a product. Because they are unfinished, the plies 3 cut from the sheet 4 of resin impregnated material are delicate, and should be handled with care to prevent loss of integrity, and to prevent contamination. The impregnated fiber material may be provided with a protective layer, e.g. a top or bottom backing that is to be removed when the plies 3 are put in the mold. Sharp folding and exertion of (planar) force on the plies 3 is to be prevented. In order to ensure this, the plies 3 are preferably picked, moved and stored in a planar orientation. Due to limited shelf life of the resin as unfinished product, after cutting the plies 3 should be processed to products fairly quickly. Also, prolonged storage of plies 3 or sets of plies 3 is better avoided.

Figure 1:
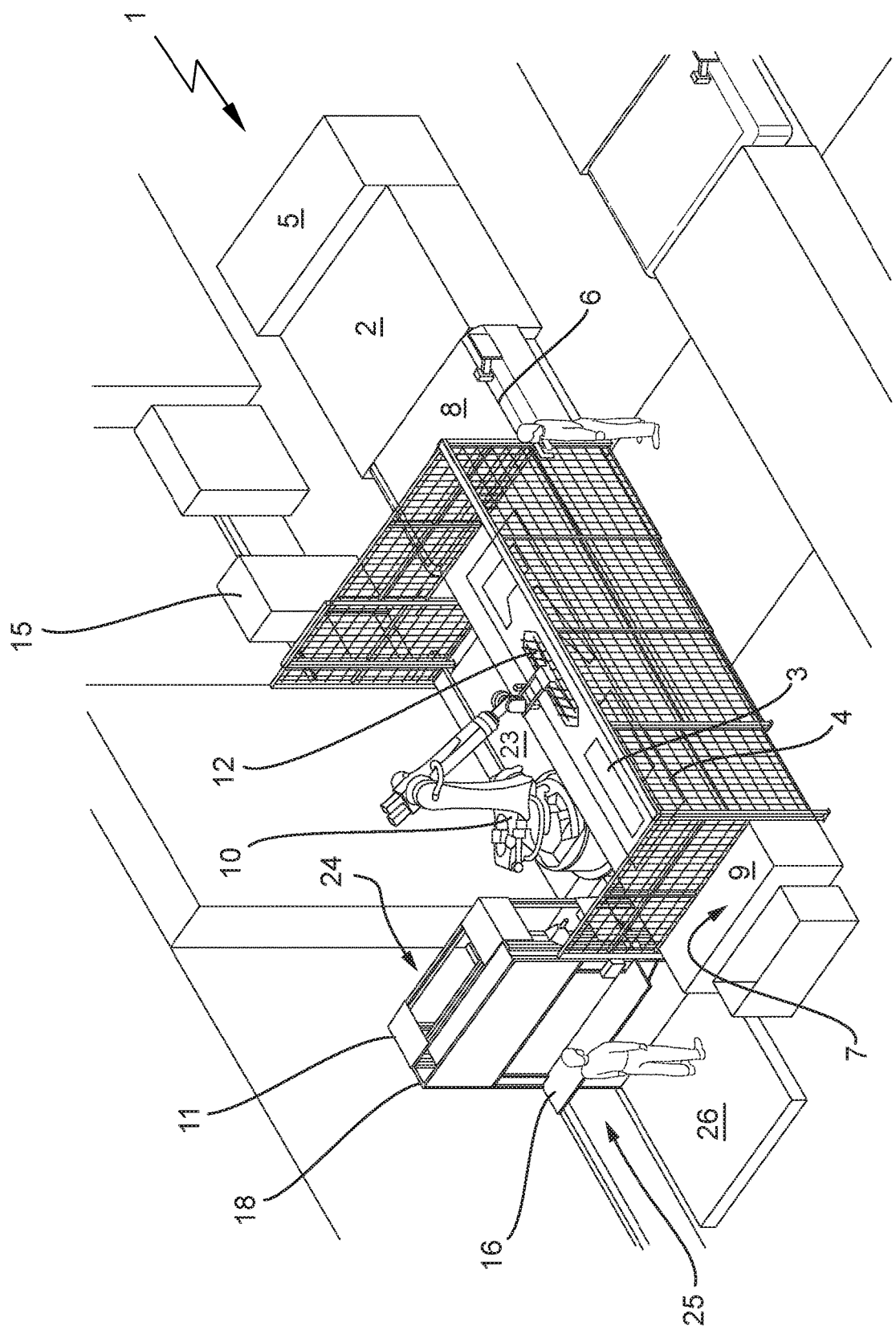
FIG. 1 shows a schematic perspective view of a ply sorting device according to a first embodiment of the invention working in tandem with a cutter.
Figure 2:
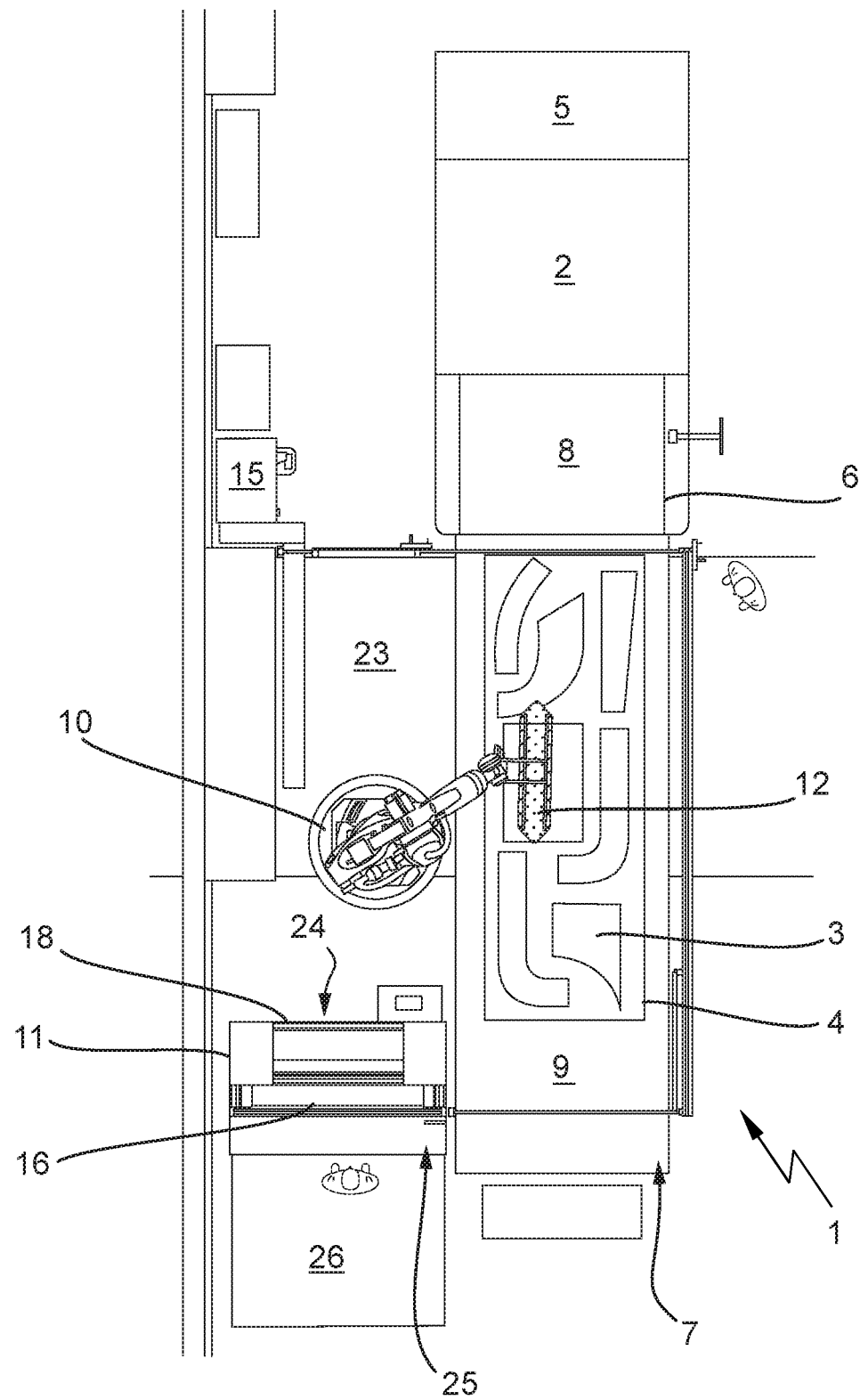
FIG. 2 shows a schematic top view of FIG. 1.

Referring to FIGS. 1 and 2, the sheet of material is typically provided on a roll, which is stored in a protective packaging. After removal of the packaging, the sheet 4 is unrolled from the roll at a roll supply 5, and is placed on a flat conveyor belt 6 of a cutter 2. The cutter 2 typically is a numerically controlled X-Y knife, laser or jet cutting machine. The cutter 2 cuts plies 3 of different geometries. Plies 3 of different geometries may together make up a set to be used for molding of a composite product. A set may typically comprise plies 3 of different size and shape, but may comprise or even consist of plies 3 of the same geometry. A composite product may itself be comprised of several sets of plies 3. To optimize the use of the sheet material, a cutting file is produced by nesting of the plies 3 of several sets. These sets may each be identical, but may also differ. For example, different sets corresponding to smaller and larger products may be nested on the sheet 4 to optimize use of the sheet material. The output of the cutter 2 is thus a sheet 4 with cutouts for plies 3, which is transported from the cutter 2 on a flat conveyor belt 6 to a pickup plane 7. In the example of FIG. 1 this is done by an unloading conveyor 8 connected to a sorting conveyor 9 at the same level. In this case, the unloading conveyor 8 defines a flat pickup plane 7 in which the cut sheet 4 lies. The plies 3 may be picked as cutouts from the moving sheet on the sorting conveyor 9.

Due to the nesting, the plies 3 are typically not in an the order so that subsequent plies 3 can be picked from the sheet 4 to form a set. For example, a ply 3 for a first set may come first, followed by another ply 3 for a second set.

Figure 3:
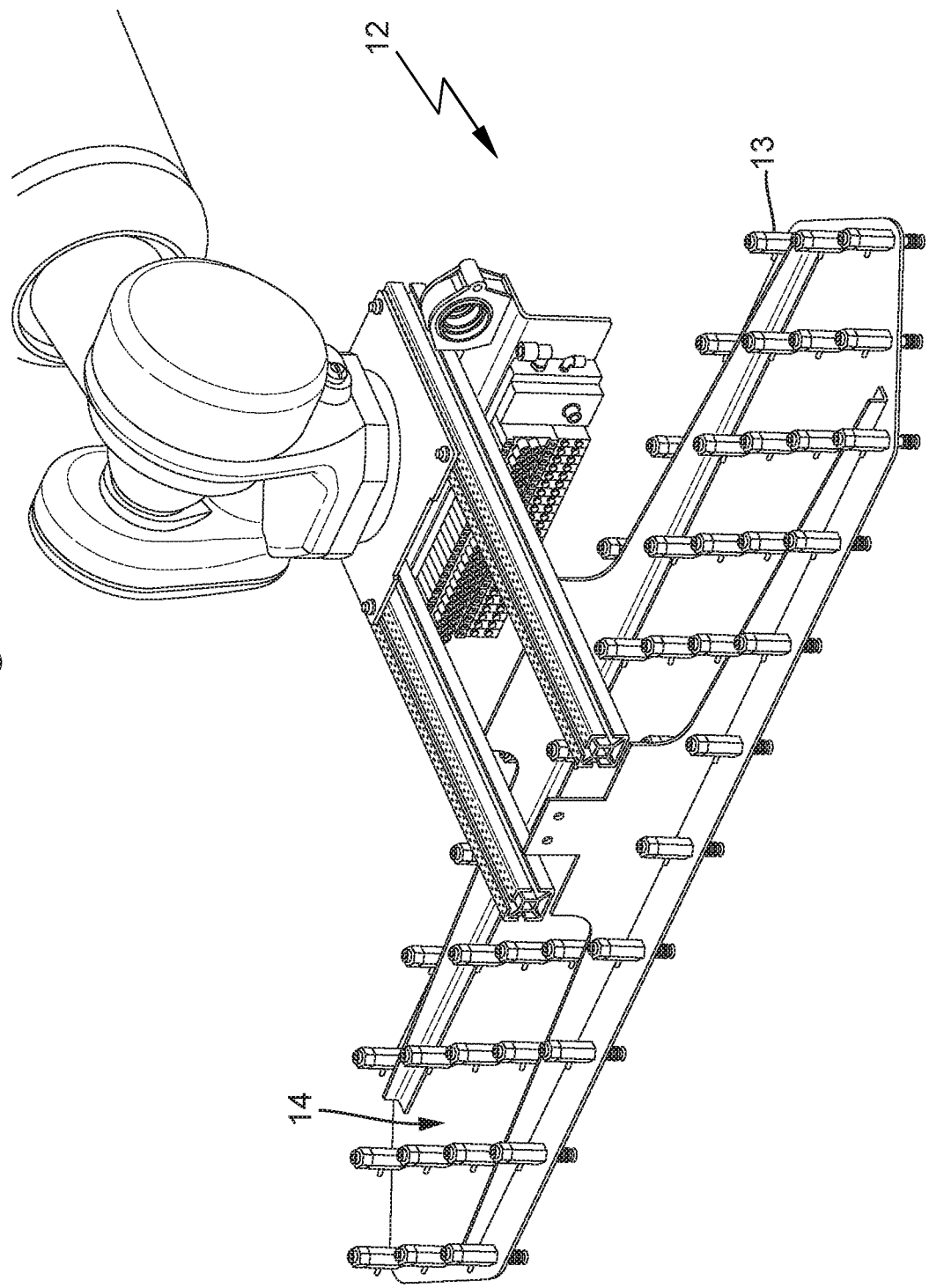
FIG. 3 shows a schematic perspective view of a gripper head of the picker of the ply sorting device of FIG. 1.

In order to accommodate for this, a ply sorting device 1 is provided. The ply sorting device 1 comprises a picker 10 and a buffer 11. In this example, the picker 10 is arranged to pick planar plies 3 of cut resin impregnated fiber material and move them to the buffer 11 in substantially planar orientation. The picker 10 is in the example of FIG. 1 embodied as a robotic arm, carrying a gripper head 12. Instead of a robotic arm, another type of moving device for the gripper head 12 may be provided, e.g. a simple rail with a movable carriage for the gripper head. Referring to FIG. 3, the gripper head 12 of the picker 10 may comprise a plurality of gripper organs 13 arranged in a gripper plane 14 of the gripper head 12, e.g. suction cups. When picking a ply 3, a select group of gripper organs 13 from the plurality of gripper organs 13 arranged in the gripper plane 14 on the picker 10 is actuated by a controller 15 depending on the geometry of the ply 3 to be picked. While picking a ply 3, the occurrence of trailing of material from a picker 10 may be detected. For this, a detection plane may be arranged parallel to the pickup plane 7, e.g. a light screen, to detect any material extending between the pickup plane 7 and the gripper plane 14.

Figure 4:
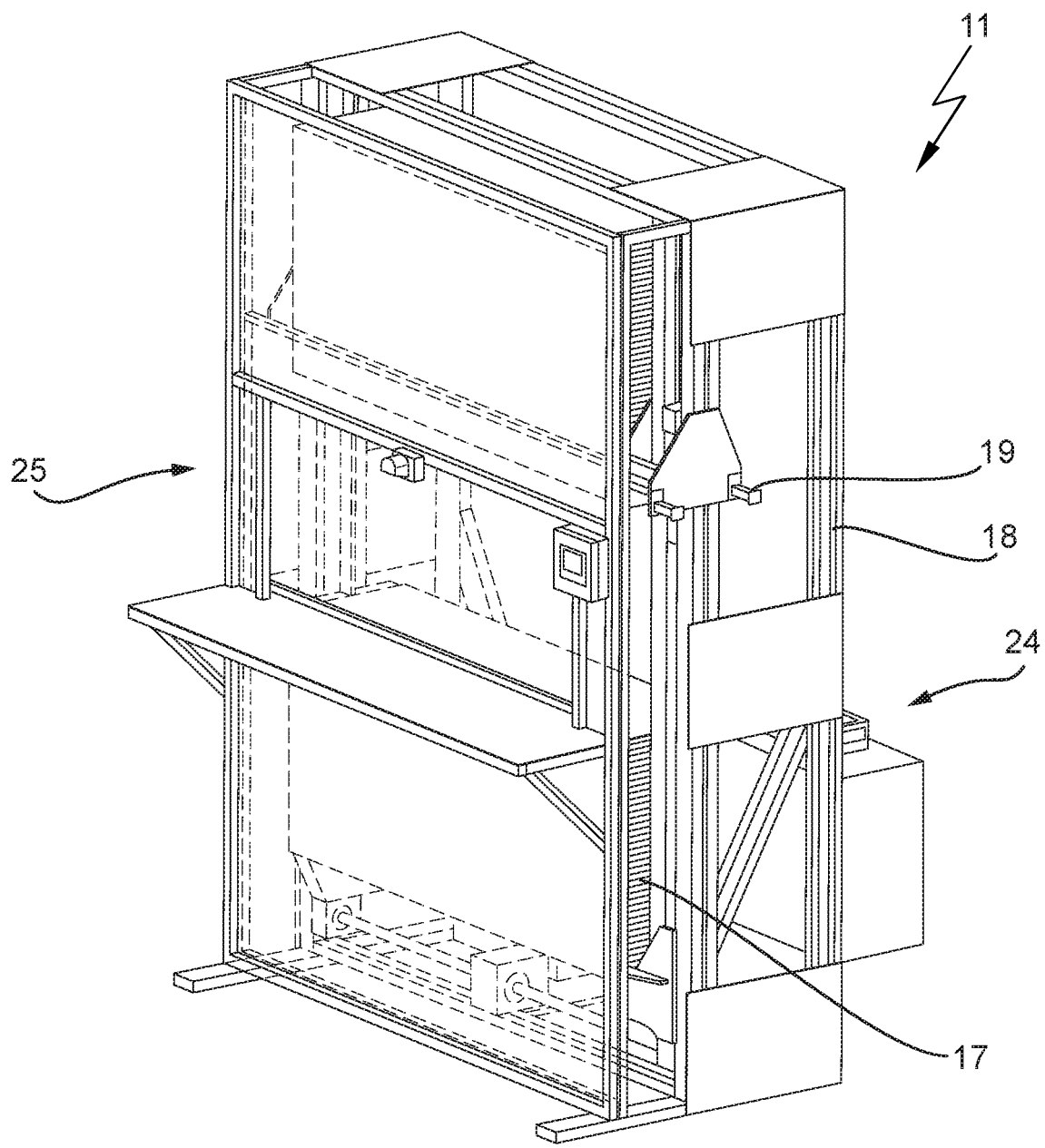
FIG. 4 shows a schematic perspective view of the buffer of the ply sorting device of FIG. 1.
Figure 5:
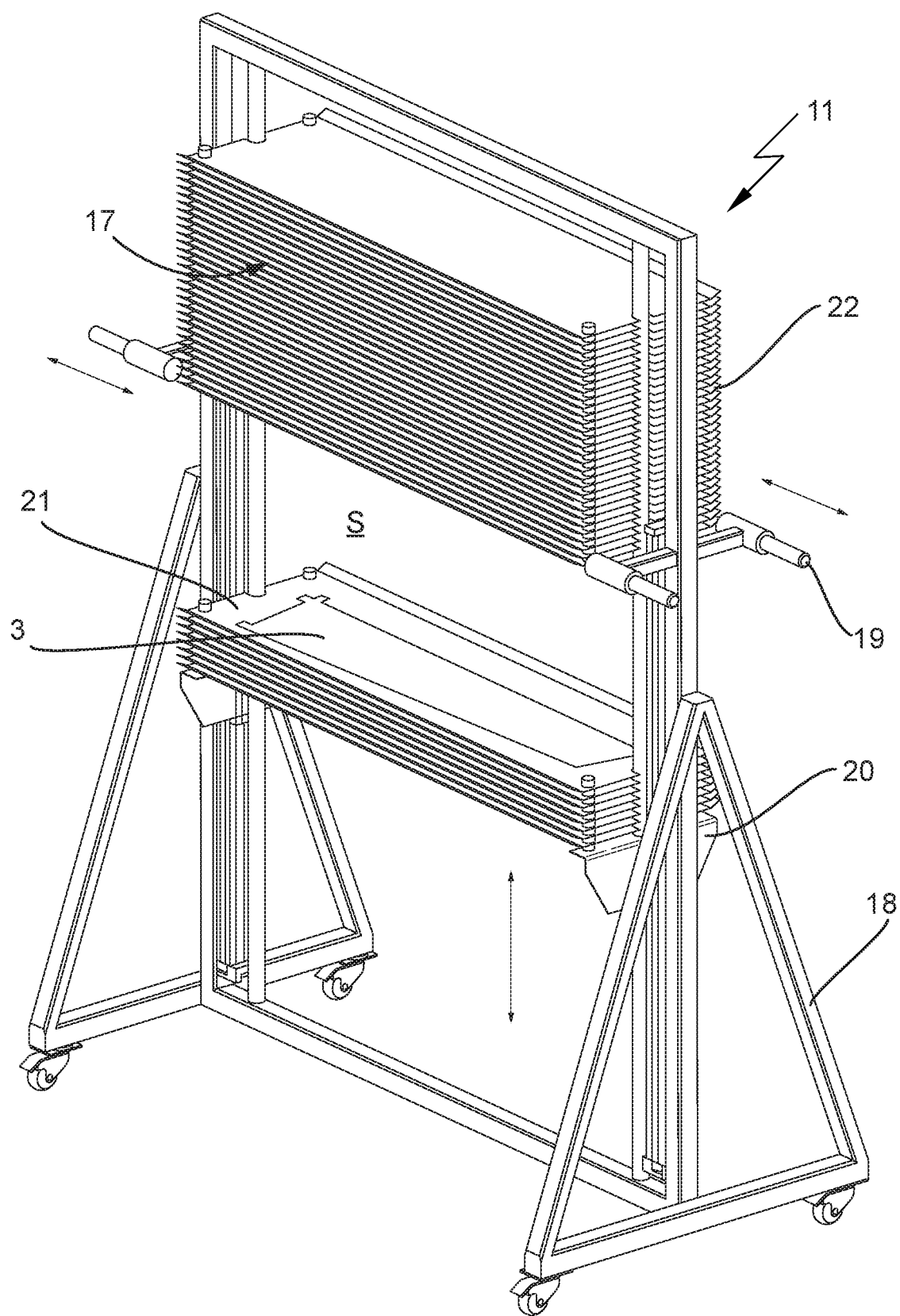
FIG. 5 shows a schematic perspective impression of an array of supports for in the buffer of FIG. 4.
Figure 6:
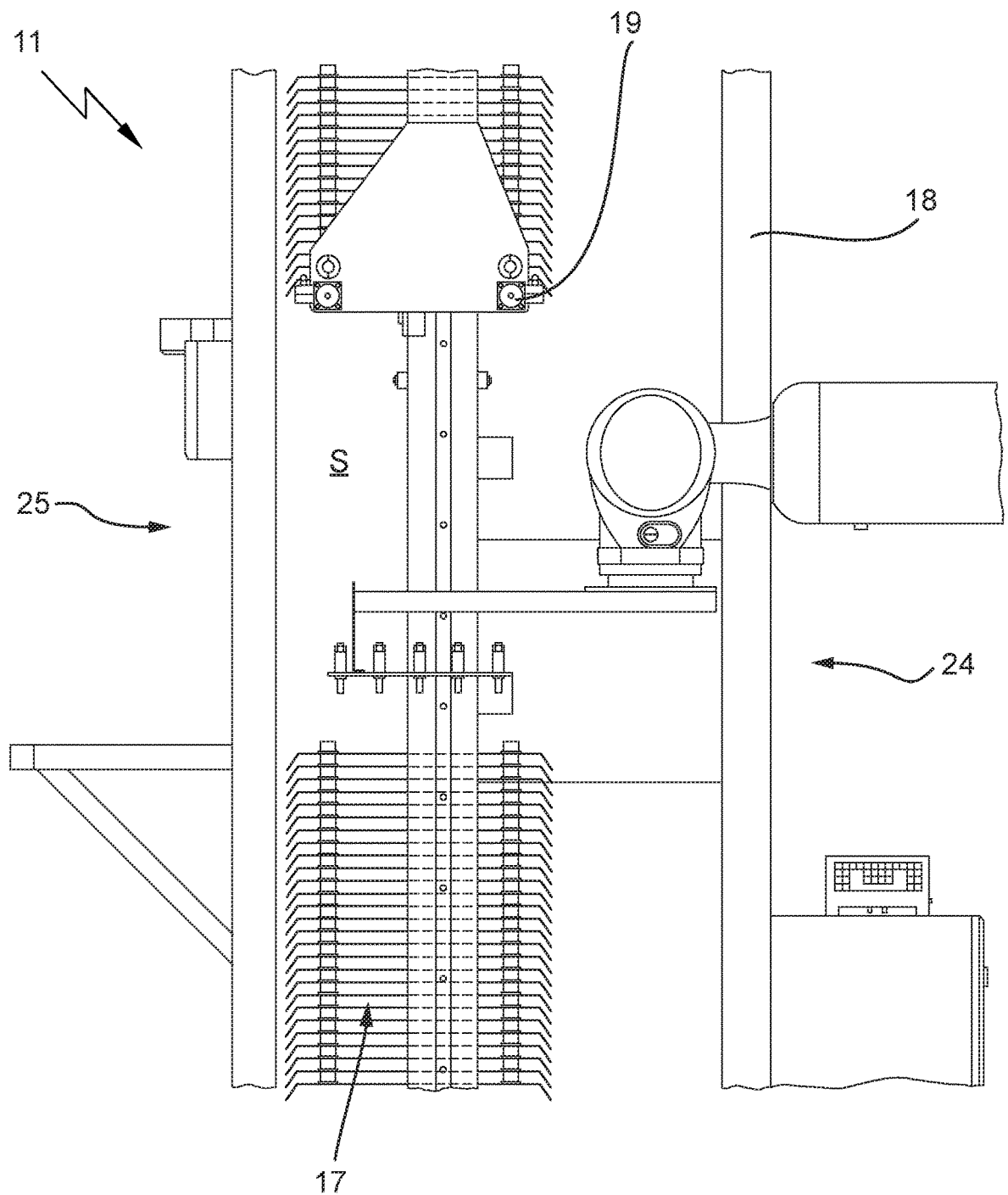
FIG. 6 shows a schematic side view of the buffer of FIG. 4.

Referring to FIGS. 4-6, the buffer 11 comprises a plurality of substantially planar supports 16 each arranged to receive plies 3 from the picker 10 and to support the plies 3 in planar orientation in a stack.

Based on the data in the cutting file, the controller 15 arranges that the planar plies 3 of cut fiber material of differing geometries are subsequently picked by the picker 10 and are each moved in substantially planar orientation to a selected one of a plurality of supports 16 of the buffer 11. The controller 15 is in communication with the cutter 2 and the sorting conveyor 9. The controller 15 can use the data of the cutting file to locate the various plies 3, and to select the support where a set is collected to which the ply 3 is to be added. At the supports 16, the plies 3 are received in a planar orientation to become part of a stacked set of plies 3. In accordance with the invention, the completion of sets in the supports 16 of the buffer 11 is used as a boundary condition in the nesting of the plies 3 in the sheet 4. During nesting, account is taken of the available space at the supports 16 in the buffer 11. For example, if for all supports 16 plies 3 have been cut, and a set at particular support lacks one ply 3 to be completed, that ply 3 is included next in the nesting of the cutting file with preference over another ply 3 with which a closer nesting may be achieved so that a support may be freed up sooner.

In accordance with an aspect of the invention, the planar supports 16 are movably arranged relative to each other to receive the plies 3. The supports 16 can be moved from a storage position in which they have a covering arrangement that prevents receiving of plies 3, to a receiving position that allows receiving of plies 3. Such a covering arrangement saves space, and prevents contamination due to sheltering. By spacing the supports 16 perpendicular to their plane, the covering arrangement may be facilitated. In this embodiment, the supports 16 are arranged to be movable perpendicular to their plane. The shelves 17 are embodied as trays, so that the plies 3 of the set may be supported in a protected trough. The shelves 17 are placed in a column, and are liftably mounted to a frame 18 transversely to the longitudinal direction of the shelves 17. The shelves 17 are liftably mounted with a variable interspace S to accommodate the picker 10 between shelves 17. As can be seen in FIG. 5 and FIG. 6, a lock 19 and a lifting table 20 may cooperate to provide a spacing between the shelves 17. The bottom shelf 21 in the spacing shown is in the receiving position, the other shelves 22 are covered and are in the storage position. The shelves of the column are thus arranged to be moved relatively to each other in groups. Adjacent shelves of the column can be parted, and provided with interspace to accommodate the gripper head of the picker between the shelves. By moving the shelves of the column up and down, the shelves that are to be parted can be positioned at a fixed height before parting. All shelves can then be made available for the picker to access at a single height position.

The column may be moved up or down to position the shelves to be parted using the lifting table 20, e.g. by driving it with a spindle via a single motor. When in position, an upper shelf of a set of shelves to be parted may be held by actuating a locking pin of the lock 19. When subsequently lowering the lifting table, an upper part of the column remains in place, while a lower part of the column moves downward, and the lower shelf 21 of the set of shelves that is on top of the lower part of the column is made accessible for the gripper head 12. This way, the lower shelf 21 of a set of shelves to be parted may be moved from a storage position in which it forms a support that is a covering arrangement with a support formed by the upper shelf of the set that prevents receiving of plies, to a receiving position that allows receiving of plies.

Referring again to FIG. 1 and FIG. 2, one side 24 of the column of shelves 17 of the buffer 11 facing the picker 10 is part of a stay out zone 23 that during operation is not accessible to humans. An opposite side 25 of the column facing away from the picker 10 is part of a safe zone 26 that during operation is accessible to humans. This way, the buffer 11 may be implemented in a flexible production cell easily accessible to a robot, and yet be easily and safely accessible to humans as well. In particular, an operator may remove a set of plies 3 that is completed manually when the shelf is in the receiving position.

Referring to FIG. 7, a second embodiment of the invention is shown. Here, the supports 16 of the buffer 11 are embodied as shelves 17 that are each slidably mounted to a frame 18 transversely to a longitudinal direction of the shelves 17. The shelves 17 are arranged in a column, and are vertically closely interspaced at fixed intervals. The shelves 17 are arranged to slide outwards at opposing sides of the column from a covering arrangement that prevents receiving of plies 3, to a receiving position that allows receiving of plies 3. In the covering arrangement the shelf overlaps with other shelves 22, and in de receiving arrangement the shelf is substantially non-overlapping with the other shelves 22 and is free to receive plies 3. At a side 24 of the column facing the picker 10 the receiving position allows the picker 10 to drop plies 3 on the shelf 27; at a side 25 of the column facing away from the picker 10 the receiving position allows an operator to take out the set of plies 3 when completed.

Referring to FIG. 8, a third embodiment of the invention is shown. Here, the supports 16 are embodied as panels of different height, that are slidable on tracks along the sorting conveyor 9. Each panel supports a number of stacks of plies 3. When the stacks are completed to a set, the sets may be removed manually.

Thus a ply sorting device is disclosed, comprising a picker and a buffer, wherein the picker is arranged to pick planar plies of cut fiber material, in particular resin impregnated material, and move them to the buffer, and wherein the buffer comprises a plurality of substantially planar supports each arranged to receive plies from the picker and to support the plies in planar orientation, preferably in a stack, wherein the planar supports are movably arranged relative to each other to receive the plies.

Also, a method of sorting plies of differing geometry is disclosed, in particular into sets, wherein planar plies of cut fiber material are picked and moved to supports of a buffer where plies are received in a planar orientation, in particular to become part of a stacked set of plies, wherein supports are moved relative to each other to receive the plies.

The invention is not limited to the exemplary embodiment represented here, but includes variations. For example, the buffer may be part of a cabinet with a controlled environment, e.g. a freezer or light blocking cabinet to improve shelf life of pre-impregnated plies (prepregs) comprising thermosetting or thermoplastic matrix material.

Further, plies of cut fiber material may be manually picked and moved to supports of a buffer, e.g. by an operator. This may be done in addition or as an alternative to the picker. The cut fiber materials may then be placed manually into trays and/or onto shelves, for example into removable trays and/or onto shelves which have been removed from the buffer. For instance, an operator may remove a tray or shelf from the buffer and place cut plies into the tray or onto the shelf, and subsequently load a stack of plies into the buffer with the tray or shelf. This way, cut plies may be manually picked and collected manually into stacks on the trays and/or shelves, e.g. to manually form stacks of identical or similar plies, or to manually form stacks of plies that form a set of plies that is not yet in the correct order for laying-up. A picker may then access the buffer of the ply sorting device to compose stacks that correspond to sets, and may put plies in the set in the correct order for laying-up.

Also, in the ply sorting device a picker may be arranged to operate between buffers. This way a first buffer e.g. may be loaded manually by an operator and trays or plies may be picked from the first buffer by the picker to moved to supports in a second buffer. This can be useful to compose sets of plies, or to put sets of plies in the right order for laying up.

Such variations shall be clear to the skilled person and are considered to fall within the scope of the invention as defined in the appended claims.

LIST OF REFERENCE SIGNS

1. Ply sorting device
2. Cutter
3. Plies
4. Sheet
5. Roll supply
6. Conveyor belt
7. Pickup plane
8. Unloading conveyor
9. Sorting conveyor
10. Picker
11. Buffer
12. Gripper head
13. Gripper organs 14. Gripper plane
15. Controller
16. Supports
17. Shelves
18. Frame
19. Lock
20. Lifting table
21. Bottom shelf
22. Other shelves
23. Stay out zone
24. Side of stay out zone
25. Side of safe zone
26. Safe zone
27. Slidable shelf
S. Interspace

The invention claimed is:

1. A ply sorting device, comprising a picker and a buffer, wherein the picker is arranged to pick planar plies of cut fiber material and move them to the buffer, and wherein the buffer comprises a plurality of planar supports interspaced perpendicular to their plane and wherein the supports are arranged to move perpendicular to their plane, each support being further arranged to receive plies from the picker and to support the plies in planar orientation, wherein the planar supports are arranged movable only perpendicular to their plane relative to each other to receive the plies, wherein the supports are arranged to be moved perpendicular to their plane from a storage position in which they have a covering arrangement of a select support that prevents receiving of plies, to a receiving position with supports above the select support spaced perpendicular relative to the plane of the select support that allows receiving of plies by the select support and wherein the select planar support assumes the receiving position by vertical movement of a group of the plurality of planar supports.

2. The ply sorting device according to claim 1, wherein the supports are shelves.

3. The ply sorting device according to claim 2, wherein the shelves are arranged above each other in a column.

4. The ply sorting device according to claim 3, wherein the shelves are each slidably mounted to a frame transversely to a longitudinal direction of the shelves.

5. The ply sorting device according to claim 2, wherein the shelves are liftably mounted to a frame transversely to a longitudinal direction of the shelves.

6. The ply sorting device according to claim 5, wherein the shelves are liftably mounted with variable interspace to accommodate the picker between shelves.

7. The ply sorting device according to claim 1, further comprising a planar pickup plane comprising a moving belt surface associated with an output of a sheet cutter arranged to cut the planar plies from a sheet.

8. The ply sorting device according to claim 7, wherein the picker comprises a plurality of gripper organs arranged in a gripper plane.

9. The ply sorting device according to claim 8, further comprising a detection plane arranged parallel to the pickup plane, to detect material extending between the pickup plane and the gripper plane.

10. The ply sorting device according to claim 1, operatively associated with a sheet cutter arranged to cut plies from a sheet.

11. The ply sorting device according to claim 1, wherein one side of the buffer facing the picker is accessible and an opposite side of the buffer facing away from the picker is accessible.

12. The ply sorting device according to claim 11, wherein the one side of the buffer facing the picker is part of a stay out zone and wherein the opposite side of the buffer facing away from the picker is part of a safe zone.

13. A method of sorting plies of differing geometry, comprising, picking and moving planar plies of cut fiber material to supports of a buffer where the plies are received in a planar orientation, and moving the supports only perpendicular to their plane relative to each other to receive the plies, wherein the supports are moved from a storage position in which they have a covering arrangement of a select support that prevents receiving of plies, to a receiving position with supports above the select support spaced perpendicular relative to the plane of the select support that allows receiving of plies by the select support and wherein the select planar support assumes the receiving position by vertical movement of a group of the plurality of planar supports.

14. The method according to claim 13, wherein the supports are moved apart in a lifting operation to receive plies.

15. The method according to claim 13, further comprising picking the plies as cutouts from a moving sheet.

16. The method according to claim 15, further comprising nesting the cutout plies in the sheet to optimize the use of sheet material.

17. The method according to claim 16, further comprising using the completion of sets in the supports of the buffer as a boundary condition in the nesting of the plies in the sheet.

18. The method according to claim 13, wherein as part of the step of picking a ply, a select group of gripper organs from a plurality of gripper organs arranged in a gripper plane on a picker is actuated depending on the geometry of the ply to be picked.

19. The method according to claim 13, wherein as part of the step of picking a ply, the occurrence of trailing of material from a picker is detected.

20. The method according to claim 13 wherein the steps of picking and moving planar piles are performed by a picker on one side of the buffer facing the picker and the buffer is accessible on the one side of the buffer and on an opposite side of the buffer facing away from the picker.

21. The method according to claim 20 wherein the one side of the buffer is part of a stay out zone and wherein the opposite side of the buffer is part of a safe zone.

22. A ply sorting device, comprising a picker and a buffer, wherein the picker is arranged to pick planar plies of cut fiber material and move them to the buffer, and wherein the buffer comprises a plurality of planar supports having a surface area greater than a footprint of a planar pile to be received on one of the plurality of planar supports, the planar supports being interspaced perpendicular to their plane and wherein the supports are arranged to move perpendicular to their plane, each support being further arranged to receive plies from the picker and to support the plies in planar orientation, wherein the planar supports are arranged movable only perpendicular to their plane relative to each other to receive the plies, wherein the supports are arranged to be moved perpendicular to their plane from a storage position in which they have a covering arrangement of a select support that prevents receiving of plies, to a receiving position with supports above the select support spaced perpendicular relative to the plane of the select support that allows receiving of plies by the select support.

* * * * *